(12) United States Patent
Craft et al.

(10) Patent No.: US 9,306,793 B1
(45) Date of Patent: Apr. 5, 2016

(54) TCP OFFLOAD DEVICE THAT BATCHES SESSION LAYER HEADERS TO REDUCE INTERRUPTS AS WELL AS CPU COPIES

(75) Inventors: Peter K. Craft, San Francisco, CA (US); Clive M. Philbrick, San Jose, CA (US)

(73) Assignee: Alacritech, Inc., San Jose, CA (US)

( * ) Notice: Subject to any disclaimer, the term of this patent is extended or adjusted under 35 U.S.C. 154(b) by 1533 days.

(21) Appl. No.: 12/581,342

(22) Filed: Oct. 19, 2009

Related U.S. Application Data (60) Provisional application No. 61/107,439, filed on Oct. 22, 2008.

(51) Int. Cl.
*G06F 15/16* (2006.01)
*H04L 29/06* (2006.01)
*H04L 12/861* (2013.01)

(52) U.S. Cl.
CPC .............. *H04L 29/06* (2013.01); *H04L 69/168* (2013.01); *H04L 49/9063* (2013.01)

(58) Field of Classification Search
CPC ... H04L 29/06; H04L 49/9063; H04L 69/168; H04L 69/169; H04L 69/18; H04L 69/32
USPC ......................................... 709/250, 235, 215
See application file for complete search history.

(56) References Cited

U.S. PATENT DOCUMENTS

| | | | |
|---|---|---|---|
| 4,366,538 A | 12/1982 | Johnson et al. | 364/200 |
| 4,485,455 A | 11/1984 | Boone et al. | 364/900 |
| 4,485,460 A | 11/1984 | Stambaugh | 365/203 |
| 4,589,063 A | 5/1986 | Shah et al. | 710/8 |
| 4,700,185 A | 10/1987 | Balph et al. | 340/825.5 |
| 4,991,133 A | 2/1991 | Davis et al. | 364/900 |
| 5,056,058 A | 10/1991 | Hirata et al. | 709/230 |

(Continued)

FOREIGN PATENT DOCUMENTS

| WO | WO 98/19412 | 5/1998 |
|---|---|---|
| WO | WO 98/50852 | 11/1998 |

(Continued)

OTHER PUBLICATIONS

Chandranmenon, Girish P. et al. "Trading Packet Headers for Packet Processing." IEEE/ACM Transactions on Networking. vol. 4, No. 2. Apr. 1996. pp. 141-152.

(Continued)

*Primary Examiner* — Hitesh Patel
(74) *Attorney, Agent, or Firm* — Mark Lauer; Silicon Edge Law Group LLP (57) ABSTRACT

A TCP offload system is disclosed including apparatuses and methods for batching session (sometimes called application) layer headers to reduce interrupts as well as CPU copies. One embodiment includes receiving a plurality of TCP packets, comprising processing the packets by TCP, including removing TCP headers from TCP data, associating the TCP data with a TCP connection for an application, and updating a TCP control block (TCB) that defines the TCP connection; locating a plurality of upper layer headers in the TCP data, the headers each corresponding to application data contained in the packets, wherein the plurality of upper layer headers correspond to a protocol that is higher than TCP; processing the plurality of upper layer headers by the application to obtain memory locations for the application data; and placing the application data in the locations, after the processing of the plurality of upper layer headers by the application.

22 Claims, 4 Drawing Sheets

(56) References Cited

U.S. PATENT DOCUMENTS

| | | | |
|---|---|---|---|
| 5,058,110 A | 10/1991 | Beach et al. | 370/85.6 |
| 5,097,442 A | 3/1992 | Ward et al. | 365/78 |
| 5,129,093 A | 7/1992 | Muramatsu et al. | |
| 5,163,131 A | 11/1992 | Row et al. | 395/200 |
| 5,212,778 A | 5/1993 | Dally et al. | 395/400 |
| 5,274,768 A | 12/1993 | Traw et al. | |
| 5,280,477 A | 1/1994 | Trapp | 370/85.1 |
| 5,281,963 A | 1/1994 | Ishikawa et al. | |
| 5,289,580 A | 2/1994 | Latif et al. | 395/275 |
| 5,303,344 A | 4/1994 | Yokoyama et al. | 395/200 |
| 5,412,782 A | 5/1995 | Hausman et al. | 395/250 |
| 5,418,912 A | 5/1995 | Christenson | 395/200 |
| 5,448,566 A | 9/1995 | Richter et al. | 370/94.1 |
| 5,485,455 A | 1/1996 | Dobbins et al. | |
| 5,485,460 A | 1/1996 | Schrier et al. | |
| 5,485,579 A | 1/1996 | Hitz et al. | 395/200.12 |
| 5,506,966 A | 4/1996 | Ban | 395/250 |
| 5,511,169 A | 4/1996 | Suda | 395/280 |
| 5,517,668 A | 5/1996 | Szwerinski et al. | 395/800 |
| 5,524,250 A | 6/1996 | Chesson et al. | 395/775 |
| 5,535,375 A | 7/1996 | Eshel et al. | 391/500 |
| 5,548,730 A | 8/1996 | Young et al. | 395/280 |
| 5,553,241 A | 9/1996 | Shirakihara | |
| 5,566,170 A | 10/1996 | Bakke et al. | 370/60 |
| 5,574,919 A | 11/1996 | Netravali et al. | 395/561 |
| 5,588,121 A | 12/1996 | Reddin et al. | 395/200.15 |
| 5,590,328 A | 12/1996 | Seno et al. | 395/675 |
| 5,592,622 A | 1/1997 | Isfeld et al. | 395/200.02 |
| 5,596,574 A | 1/1997 | Perlman et al. | |
| 5,598,410 A | 1/1997 | Stone | 370/469 |
| 5,619,650 A | 4/1997 | Bach et al. | 395/200.01 |
| 5,629,933 A | 5/1997 | Delp et al. | 370/411 |
| 5,633,780 A | 5/1997 | Cronin et al. | 361/220 |
| 5,634,099 A | 5/1997 | Andrews et al. | 395/200.07 |
| 5,634,127 A | 5/1997 | Cloud et al. | 395/680 |
| 5,642,482 A | 6/1997 | Pardillos | 395/200.2 |
| 5,664,114 A | 9/1997 | Krech, Jr. et al. | 395/200.64 |
| 5,671,355 A | 9/1997 | Collins | 395/200.2 |
| 5,678,060 A | 10/1997 | Yokoyama et al. | 709/212 |
| 5,682,534 A | 10/1997 | Kapoor et al. | 395/684 |
| 5,684,954 A | 11/1997 | Kaiserswerth et al. | |
| 5,692,130 A | 11/1997 | Shobu et al. | 395/200.12 |
| 5,699,317 A | 12/1997 | Sartore et al. | 395/230.06 |
| 5,699,350 A | 12/1997 | Kraslavsky | 370/254 |
| 5,701,434 A | 12/1997 | Nakagawa | 395/484 |
| 5,701,516 A | 12/1997 | Cheng et al. | 395/842 |
| 5,706,514 A | 1/1998 | Bonola | |
| 5,727,142 A | 3/1998 | Chen | 395/181 |
| 5,742,765 A | 4/1998 | Wong et al. | 395/200 |
| 5,749,095 A | 5/1998 | Hagersten | 711/141 |
| 5,751,715 A | 5/1998 | Chan et al. | 370/455 |
| 5,751,723 A | 5/1998 | Vanden Heuvel et al. | |
| 5,752,078 A | 5/1998 | Delp et al. | 395/827 |
| 5,758,084 A | 5/1998 | Silverstein et al. | 395/200.58 |
| 5,758,089 A | 5/1998 | Gentry et al. | 395/200.64 |
| 5,758,186 A | 5/1998 | Hamilton et al. | 395/831 |
| 5,758,194 A | 5/1998 | Kuzma | 395/886 |
| 5,768,618 A | 6/1998 | Erickson et al. | 395/829 |
| 5,771,349 A | 6/1998 | Picazo, Jr. et al. | 395/188.01 |
| 5,774,660 A | 6/1998 | Brendel et al. | 395/200.31 |
| 5,778,013 A | 7/1998 | Jedwab | 714/807 |
| 5,778,419 A | 7/1998 | Hansen et al. | 711/112 |
| 5,790,804 A | 8/1998 | Osborne | 709/245 |
| 5,794,061 A | 8/1998 | Hansen et al. | 395/800.01 |
| 5,799,150 A | 8/1998 | Hamilton et al. | |
| 5,802,258 A | 9/1998 | Chen | 395/182.08 |
| 5,802,580 A | 9/1998 | McAlpice | 711/149 |
| 5,809,328 A | 9/1998 | Nogales et al. | 395/825 |
| 5,809,527 A | 9/1998 | Cooper et al. | 711/133 |
| 5,812,775 A | 9/1998 | Van Seters et al. | 395/200.43 |
| 5,815,646 A | 9/1998 | Purcell et al. | 395/163 |
| 5,819,111 A | 10/1998 | Davies et al. | |
| 5,828,835 A | 10/1998 | Isfeld et al. | 395/200.3 |
| 5,848,293 A | 12/1998 | Gentry | 395/825 |
| 5,870,394 A | 2/1999 | Oprea | |
| 5,872,919 A | 2/1999 | Wakeland et al. | 395/200 |
| 5,878,225 A | 3/1999 | Bilansky et al. | 395/200.57 |
| 5,878,227 A | 3/1999 | Wade et al. | |
| 5,892,903 A | 4/1999 | Klaus | 395/187.01 |
| 5,898,713 A | 4/1999 | Melzer et al. | 371/53 |
| 5,913,028 A | 6/1999 | Wang et al. | 395/200.33 |
| 5,915,094 A | 6/1999 | Kouloheris et al. | |
| 5,917,828 A | 6/1999 | Thompson | |
| 5,920,566 A | 7/1999 | Hendel et al. | 370/401 |
| 5,926,642 A | 7/1999 | Favor | |
| 5,930,830 A | 7/1999 | Mendelson et al. | 711/171 |
| 5,931,918 A | 8/1999 | Row et al. | 709/300 |
| 5,935,205 A | 8/1999 | Murayama et al. | 709/216 |
| 5,935,249 A | 8/1999 | Stern et al. | |
| 5,937,169 A | 8/1999 | Connery et al. | 395/200.8 |
| 5,941,969 A | 8/1999 | Ram et al. | 710/128 |
| 5,941,972 A | 8/1999 | Hoese et al. | 710/129 |
| 5,950,203 A | 9/1999 | Stakuis et al. | 707/10 |
| 5,963,876 A | 10/1999 | Manssen et al. | |
| 5,978,844 A | 11/1999 | Tsuchiya et al. | |
| 5,987,022 A | 11/1999 | Geiger et al. | 370/349 |
| 5,991,299 A | 11/1999 | Radogna et al. | 370/392 |
| 5,996,013 A | 11/1999 | Delp et al. | 709/226 |
| 5,996,024 A | 11/1999 | Blumenau | 709/301 |
| 6,005,849 A | 12/1999 | Roach et al. | 370/276 |
| 6,009,478 A | 12/1999 | Panner et al. | 710/5 |
| 6,014,380 A | 1/2000 | Hendel et al. | |
| 6,014,557 A | 1/2000 | Morton et al. | |
| 6,016,513 A | 1/2000 | Lowe | 709/250 |
| 6,021,446 A | 2/2000 | Gentry et al. | 709/303 |
| 6,021,507 A | 2/2000 | Chen | 714/2 |
| 6,026,452 A | 2/2000 | Pitts | 710/56 |
| 6,034,963 A | 3/2000 | Minami et al. | 370/401 |
| 6,038,562 A | 3/2000 | Anjur et al. | 707/10 |
| 6,041,058 A | 3/2000 | Flanders et al. | 370/401 |
| 6,041,381 A | 3/2000 | Hoese | 710/129 |
| 6,044,438 A | 3/2000 | Olnowich | 711/130 |
| 6,047,323 A | 4/2000 | Krause | 709/227 |
| 6,047,356 A | 4/2000 | Anderson et al. | 711/129 |
| 6,049,528 A | 4/2000 | Hendel et al. | 370/235 |
| 6,057,863 A | 5/2000 | Olarig | 345/520 |
| 6,061,368 A | 5/2000 | Hitzelberger | 370/537 |
| 6,065,096 A | 5/2000 | Day et al. | 711/114 |
| 6,067,569 A | 5/2000 | Khaki et al. | 709/224 |
| 6,070,200 A | 5/2000 | Gates et al. | 710/20 |
| 6,078,564 A | 6/2000 | Lakshman et al. | |
| 6,078,733 A | 6/2000 | Osborne | 395/200.8 |
| 6,097,734 A | 8/2000 | Gotesman et al. | 370/474 |
| 6,101,555 A | 8/2000 | Goshey et al. | 709/321 |
| 6,111,673 A | 8/2000 | Chang et al. | 359/123 |
| 6,115,615 A | 9/2000 | Ota et al. | 455/553 |
| 6,122,670 A | 9/2000 | Bennett et al. | 709/236 |
| 6,141,701 A | 10/2000 | Whitney | 710/5 |
| 6,141,705 A | 10/2000 | Anand et al. | 710/15 |
| 6,145,017 A | 11/2000 | Ghaffari | 710/5 |
| 6,157,944 A | 12/2000 | Pedersen | 709/204 |
| 6,157,955 A | 12/2000 | Narad et al. | 709/228 |
| 6,172,980 B1 | 1/2001 | Flanders et al. | 370/401 |
| 6,173,333 B1 | 1/2001 | Jolitz et al. | |
| 6,202,105 B1 | 3/2001 | Gates et al. | 710/20 |
| 6,219,693 B1 | 4/2001 | Napolitano et al. | |
| 6,223,242 B1 | 4/2001 | Sheafor et al. | 710/132 |
| 6,226,680 B1 | 5/2001 | Boucher et al. | 709/230 |
| 6,233,242 B1 | 5/2001 | Mayer et al. | |
| 6,243,667 B1 | 6/2001 | Kerr et al. | |
| 6,246,683 B1 | 6/2001 | Connery et al. | 370/392 |
| 6,247,060 B1 | 6/2001 | Boucher et al. | 709/238 |
| 6,279,051 B1 | 8/2001 | Gates et al. | 710/20 |
| 6,289,023 B1 | 9/2001 | Dowling et al. | 370/419 |
| 6,298,403 B1 | 10/2001 | Suri et al. | 710/100 |
| 6,324,649 B1 | 11/2001 | Eyres et al. | 713/202 |
| 6,334,153 B2 | 12/2001 | Boucher et al. | 709/230 |
| 6,343,345 B1 | 1/2002 | Hilla et al. | |
| 6,343,360 B1 | 1/2002 | Feinleib | 713/1 |
| 6,345,301 B1 | 2/2002 | Burns et al. | 709/230 |
| 6,345,302 B1 | 2/2002 | Bennett et al. | 709/236 |
| 6,356,951 B1 | 3/2002 | Gentry et al. | 709/250 |
| 6,370,599 B1 | 4/2002 | Anand et al. | 710/15 |
| 6,385,647 B1 | 5/2002 | Willis et al. | 709/217 |

(56) References Cited

U.S. PATENT DOCUMENTS

| | | | |
|---|---|---|---|
| 6,389,468 B1 | 5/2002 | Muller et al. | 709/226 |
| 6,389,479 B1 | 5/2002 | Boucher et al. | 709/243 |
| 6,393,487 B2 | 5/2002 | Boucher et al. | 709/238 |
| 6,418,169 B1 | 7/2002 | Datari | |
| 6,421,742 B1 | 7/2002 | Tillier | 710/1 |
| 6,421,753 B1 | 7/2002 | Hoese et al. | 710/129 |
| 6,427,169 B1 | 7/2002 | Elzur | 709/224 |
| 6,427,171 B1 | 7/2002 | Craft et al. | 709/230 |
| 6,427,173 B1 | 7/2002 | Boucher et al. | 709/238 |
| 6,434,620 B1 | 8/2002 | Boucher et al. | 709/230 |
| 6,434,651 B1 | 8/2002 | Gentry, Jr. | 710/260 |
| 6,449,656 B1 | 9/2002 | Elzur et al. | 709/236 |
| 6,452,915 B1 | 9/2002 | Jorgensen | |
| 6,453,360 B1 | 9/2002 | Muller et al. | 709/250 |
| 6,453,406 B1 | 9/2002 | Sarnikowski et al. | |
| 6,470,415 B1 | 10/2002 | Starr et al. | 711/104 |
| 6,473,425 B1 | 10/2002 | Bellaton et al. | 370/392 |
| 6,480,489 B1 | 11/2002 | Muller et al. | 370/389 |
| 6,483,804 B1 | 11/2002 | Muller et al. | |
| 6,487,202 B1 | 11/2002 | Klausmeier et al. | 370/395 |
| 6,487,654 B2 | 11/2002 | Dowling | 712/244 |
| 6,490,631 B1 | 12/2002 | Teich et al. | 709/250 |
| 6,502,144 B1 | 12/2002 | Accarie | 710/8 |
| 6,523,119 B2 | 2/2003 | Pavlin et al. | 713/192 |
| 6,526,446 B1 | 2/2003 | Yang et al. | |
| 6,542,504 B1 | 4/2003 | Mahler et al. | |
| 6,570,884 B1 | 5/2003 | Connery et al. | 370/419 |
| 6,591,302 B2 | 7/2003 | Boucher et al. | 709/230 |
| 6,591,310 B1 | 7/2003 | Johnson | 710/3 |
| 6,594,261 B1 | 7/2003 | Boura et al. | |
| 6,631,484 B1 | 10/2003 | Born | |
| 6,648,611 B2 | 11/2003 | Morse et al. | 417/310 |
| 6,650,640 B1 | 11/2003 | Muller et al. | 370/392 |
| 6,657,757 B1 | 12/2003 | Chang et al. | 359/124 |
| 6,658,480 B2 | 12/2003 | Boucher et al. | 709/239 |
| 6,678,283 B1 | 1/2004 | Teplitsky | 370/463 |
| 6,681,364 B1 | 1/2004 | Calvignac et al. | 714/776 |
| 6,683,851 B1 | 1/2004 | Willkie et al. | |
| 6,181,705 B1 | 2/2004 | San-Hong Kim | 370/392 |
| 6,687,758 B2 | 2/2004 | Craft et al. | 709/250 |
| 6,697,366 B1 | 2/2004 | Kim | |
| 6,697,868 B2 | 2/2004 | Craft et al. | 709/230 |
| 6,751,665 B2 | 6/2004 | Philbrick et al. | 709/224 |
| 6,757,746 B2 | 6/2004 | Boucher et al. | 709/250 |
| 6,765,901 B1 | 7/2004 | Johnson et al. | 370/352 |
| 6,807,581 B1 | 10/2004 | Starr et al. | 709/250 |
| 6,842,896 B1 | 1/2005 | Redding et al. | 717/172 |
| 6,862,264 B1 | 3/2005 | Moura et al. | |
| 6,912,522 B2 | 6/2005 | Edgar | 707/2 |
| 6,938,092 B2 | 8/2005 | Burns | 709/230 |
| 6,941,386 B2 | 9/2005 | Craft et al. | 709/250 |
| 6,965,941 B2 | 11/2005 | Boucher et al. | 709/230 |
| 6,976,148 B2 | 12/2005 | Arimilli et al. | |
| 6,996,070 B2 | 2/2006 | Starr et al. | 370/252 |
| 7,016,361 B2 | 3/2006 | Swonk et al. | |
| 7,042,898 B2 | 5/2006 | Blightman et al. | 370/463 |
| 7,047,320 B2 | 5/2006 | Arimilli et al. | |
| 7,073,196 B1 | 7/2006 | Dowd et al. | |
| 7,076,568 B2 | 7/2006 | Philbrick et al. | 709/250 |
| 7,089,326 B2 | 8/2006 | Boucher et al. | 709/242 |
| 7,093,099 B2 | 8/2006 | Bodas et al. | 711/206 |
| 7,124,205 B2 | 10/2006 | Craft et al. | 709/250 |
| 7,133,940 B2 | 11/2006 | Blightman et al. | 710/22 |
| 7,167,926 B1 | 1/2007 | Boucher et al. | 709/250 |
| 7,167,927 B2 | 1/2007 | Philbrick et al. | 709/250 |
| 7,174,393 B2 | 2/2007 | Boucher et al. | 709/250 |
| 7,181,531 B2 | 2/2007 | Pinkerton et al. | |
| 7,185,266 B2 | 2/2007 | Blightman et al. | 714/776 |
| 7,187,679 B2 | 3/2007 | Dally et al. | |
| 7,191,241 B2 | 3/2007 | Boucher et al. | 709/230 |
| 7,191,318 B2 | 3/2007 | Tripathy et al. | 712/225 |
| 7,237,036 B2 | 6/2007 | Boucher et al. | 709/245 |
| 7,254,696 B2 | 8/2007 | Mittal et al. | 712/210 |
| 7,283,522 B2 | 10/2007 | Siddabathuni | |
| 7,284,070 B2 | 10/2007 | Boucher et al. | 709/250 |
| 7,287,092 B2 | 10/2007 | Sharp | |
| 7,337,241 B2 | 2/2008 | Boucher et al. | |
| 7,461,160 B2 | 12/2008 | Boucher et al. | |
| 7,472,156 B2 | 12/2008 | Philbrick et al. | |
| 7,496,689 B2 | 2/2009 | Sharp et al. | |
| 7,502,869 B2 | 3/2009 | Boucher et al. | |
| 7,519,699 B2 | 4/2009 | Jain et al. | |
| 7,543,087 B2 | 6/2009 | Philbrick et al. | |
| 7,584,260 B2 | 9/2009 | Craft et al. | |
| 7,620,726 B2 | 11/2009 | Craft et al. | |
| 7,627,001 B2 | 12/2009 | Craft et al. | |
| 7,627,684 B2 | 12/2009 | Boucher et al. | |
| 7,640,364 B2 | 12/2009 | Craft et al. | |
| 7,664,868 B2 | 2/2010 | Boucher et al. | |
| 7,664,883 B2 | 2/2010 | Craft et al. | |
| 7,673,072 B2 | 3/2010 | Boucher et al. | |
| 7,694,024 B2 | 4/2010 | Philbrick et al. | |
| 7,738,500 B1 | 6/2010 | Jones et al. | |
| 2001/0004354 A1 | 6/2001 | Jolitz | 370/328 |
| 2001/0013059 A1 | 8/2001 | Dawson et al. | 709/217 |
| 2001/0014892 A1 | 8/2001 | Gaither et al. | 707/200 |
| 2001/0014954 A1 | 8/2001 | Purcell et al. | 714/4 |
| 2001/0025315 A1 | 9/2001 | Jolitz | 709/231 |
| 2001/0037406 A1 | 11/2001 | Philbrick et al. | |
| 2001/0048681 A1 | 12/2001 | Bilic et al. | 370/389 |
| 2001/0053148 A1 | 12/2001 | Bilic et al. | 370/389 |
| 2002/0073223 A1 | 6/2002 | Darnell et al. | 709/232 |
| 2002/0112175 A1 | 8/2002 | Makofka et al. | 713/200 |
| 2002/0156927 A1 | 10/2002 | Boucher et al. | |
| 2003/0014544 A1 | 1/2003 | Pettey | |
| 2003/0046330 A1 | 3/2003 | Hayes | |
| 2003/0066011 A1 | 4/2003 | Oren | 714/758 |
| 2003/0067903 A1 | 4/2003 | Jorgensen | |
| 2003/0110344 A1 | 6/2003 | Szczepanek et al. | 711/100 |
| 2003/0165160 A1 | 9/2003 | Minami et al. | 370/466 |
| 2004/0010545 A1* | 1/2004 | Pandya | 709/203 |
| 2004/0010712 A1 | 1/2004 | Hui et al. | |
| 2004/0042458 A1 | 3/2004 | Elzu | |
| 2004/0042464 A1 | 3/2004 | Elzur et al. | |
| 2004/0049580 A1 | 3/2004 | Boyd et al. | |
| 2004/0049601 A1 | 3/2004 | Boyd et al. | |
| 2004/0054814 A1 | 3/2004 | McDaniel | |
| 2004/0059926 A1 | 3/2004 | Angelo et al. | 713/168 |
| 2004/0064590 A1* | 4/2004 | Starr et al. | 709/250 |
| 2004/0088262 A1 | 5/2004 | Boucher et al. | |
| 2004/0153578 A1 | 8/2004 | Elzur | |
| 2004/0210795 A1 | 10/2004 | Anderson | |
| 2004/0213290 A1 | 10/2004 | Johnson et al. | 370/469 |
| 2004/0240435 A1* | 12/2004 | Boucher et al. | 370/352 |
| 2004/0246974 A1 | 12/2004 | Gyugyi et al. | 370/395.31 |
| 2004/0249957 A1 | 12/2004 | Ekis et al. | |
| 2005/0060538 A1 | 3/2005 | Beverly | |
| 2005/0108518 A1* | 5/2005 | Pandya | 713/151 |
| 2005/0144300 A1 | 6/2005 | Craft et al. | |
| 2006/0133386 A1 | 6/2006 | McCormack et al. | |
| 2006/0248208 A1 | 11/2006 | Walbeck et al. | |
| 2007/0083682 A1 | 4/2007 | Bartley et al. | |
| 2007/0140240 A1 | 6/2007 | Dally et al. | |
| 2008/0043732 A1 | 2/2008 | Desai et al. | |
| 2008/0095182 A1* | 4/2008 | Elzur et al. | 370/412 |
| 2008/0170501 A1 | 7/2008 | Patel et al. | |
| 2008/0209084 A1 | 8/2008 | Wang et al. | |
| 2008/0240111 A1 | 10/2008 | Gadelrab | |
| 2008/0253395 A1* | 10/2008 | Pandya | 370/469 |
| 2009/0063696 A1* | 3/2009 | Wang et al. | 709/232 |

FOREIGN PATENT DOCUMENTS

| | | |
|---|---|---|
| WO | WO 99/04343 | 1/1999 |
| WO | WO 99/65219 | 12/1999 |
| WO | WO 00/13091 | 3/2000 |
| WO | WO 01/04770 | 1/2001 |
| WO | WO 01/05107 | 1/2001 |
| WO | WO 01/05116 | 1/2001 |
| WO | WO 01/05123 | 1/2001 |
| WO | WO 01/40960 | 6/2001 |
| WO | WO 01/59966 | 8/2001 |
| WO | WO 01/86430 | 11/2001 |
| WO | WO 2007-130476 | 11/2007 |

(56) References Cited

FOREIGN PATENT DOCUMENTS

OTHER PUBLICATIONS

Merritt, Rick. "Ethernet Interconnect Infiniband at Intel." EE Times article. Sep. 12, 2003. 3 pages.
Craft, Peter K. et al. "TCP Offload Device that Batches Session Layer Headers to Reduce Interrupts as Well as CPU Copies." U.S. Appl. No. 12/581,342, filed Oct. 19, 2009.
Craft, Peter K. et al. "TCP Offload Send Optimization." U.S. Appl. No. 12/504,021, filed Jul. 16, 2009.
Philbrick, Clive M. et al. "Freeing Transmit Memory on a Network Interface Device Prior to Receiving an Acknowledgment That Transmit Data Has Been Received by a Remote Device." U.S. Appl. No. 12/470,980, filed May 22, 2009.
Starr, Daryl D. et al. "Accelerating Data Transfer in a Virtual Computer System with Tightly Coupled TCP Connections." U.S. Appl. No. 12/410,366, filed Mar. 24, 2009.
Boucher, Laurence B. et al. "Obtaining a Destination Address So That a Network Interface Device Can Write Network Data Without Headers Directly Into Host Memory." U.S. Appl. No. 12/325,941, filed Dec. 1, 2008.
Boucher, Laurence B. et al. "Enabling an Enhanced Function of an Electronic Device." U.S. Appl. No. 11/985,948, filed Nov. 19, 2007.
Starr, Daryl D. et al. "Network Interface Device With Gb/s Full-Duplex Transfer Rate." U.S. Appl. No. 11/799,720, filed May 1, 2007.
Craft, Peter K. et al. "Peripheral Device that DMAS the Same Date to Different Locations in a Computer." U.S. Appl. No. 11/788,719, filed Apr. 19, 2007.
Boucher, Laurence B. et al. "TCP/IP Offload Network Interface Device." U.S. Appl. No. 11/701,705, filed Feb. 2, 2007.
Starr, Daryl D. et al. "TCP/IP Offload Device With Reduced Sequential Processing." U.S. Appl. No. 11/348,810, filed Feb. 6, 2006.
Craft, Peter K. et al. "Transferring Control of TCP Connections Between Hierarchy of Processing Mechanisms." U.S. Appl. No. 11/249,006, filed Oct. 11, 2005.
Boucher, Laurence B. et al. "Network Interface Device That Can Transfer Control of a TCP Connection to a Host CPU." U.S. Appl. No. 11/029,863, filed Jan. 4, 2005.
Craft, Peter K. et al. "Protocol Stack That Offloads a TCP Connection From a Host Computer to a Network Interface Device." U.S. Appl. No. 11/016,642, filed Dec. 16, 2004.
Boucher, Laurence B. et al. "Method and Apparatus for Dynamic Packet Batching With a High Performance Network Interface." U.S. Appl. No. 10/678,336, filed Oct. 3, 2003.
Philbrick Clive M. et al. "Method and Apparatus for Data Re-Assembly With a High Performance Network Interface." U.S. Appl. No. 10/634,062, filed Aug. 4, 2003.
Boucher, Laurence B. et al. "High Network Interface Device and System for Accelerated Communication." U.S. Appl. No. 10/601,237, filed Jun. 19, 2003.
Boucher, Laurence B. et al. "Method and Apparatus for Distributing Network Traffic Processing on a Muliprocessor Computer." U.S. Appl. No. 10/438,719, filed May 14, 2003.
Boucher, Laurence B. et al. "Parsing a Packet Header." U.S. Appl. No. 10/277,604, filed Oct. 18, 2002.
Starr, Daryl D.. et al. "Intelligient Network Storage Interface System." U.S. Appl. No. 10/261,051, filed Sep. 30, 2002.
Boucher, Laurence B. et al. "Intelligent Network Interface System and Method for Accelerated Protocol Processing." U.S. Appl. No. 09/692,561, filed Oct. 18, 2000.
Starr, David D. et al. "Intelligent Network Storage Interface Device." U.S. Appl. No. 09/675,700, filed Sep. 29, 2000.
Merritt, Rick. "Ethernet Interconnect Outpacing Infiniband at Intel." EE Times article. Sep. 11, 2002. 9 pages.
Internet pages entitled "Hardware Assisted Protocol Processing", (which Eugene Feinber is working on), 1 page, printed Nov. 25, 1998.
Zilog product Brief entitled "Z85C30 CMOS SCC Serial Communication Controller", Zilog Inc., 3 pages, 1997.

Internet pages of Xpoint Technologies, Inc. entitled "Smart LAN Work Requests", 5 pages, printed Dec. 19, 1997.
Internet pages entitled: Asante and 100BASE-T Fast Ethernet. 7 pages, printed May 27, 1997.
Internet pages entitled: A Guide to the Paragon XP/S-A7 Supercomputer at Indiana University. 13 pages, printed Dec. 21, 1998.
Richard Stevens, "TCP/IP Illustrated, vol. 1, The Protocols", pp. 325-326 (1994).
Internet pages entitled: Northridge/Southbridge vs. Intel Hub Architecture, 4 pages, printed Feb. 19, 2001.
Gigabit Ethernet Technical Brief, Achieving End-to-End Performance. Alteon Networks, Inc., First Edition, Sep. 1996, 15 pages.
Internet pages directed to Technical Brief on Alteon Ethernet Gigabit NIC technology, www.alteon.com, 14 pages, printed Mar. 15, 1997.
VIA Technologies, Inc. article entitled "VT8501 Apollo MVP4", pp. i-iv, 1-11, cover and copyright page, revision 1.3, Feb. 1, 2000.
iReady News Archives article entitled "iReady Rounding Out Management Team with Two Key Executives", http://www.ireadyco.com/archives/keyexec.html, 2 pages, printed Nov. 28, 1998.
"Toshiba Delivers First Chips to Make Consumer Devices Internet-Ready Based on iReady's Design," Press Release Oct. 1998, 3 pages, printed Nov. 28, 1998.
Internet pages from iReady Products, web sitehttp://www.ireadyco.com/products,html, 2 pages, downloaded Nov. 25, 1998.
iReady News Archives, Toshiba, iReady shipping Internet chip, 1 page, printed Nov. 25, 1998.
Interprophet article entitled "Technology", http://www.interprophet.com/technology.html, 17 pages, printed Mar. 1, 2000.
iReady Corporation, article entitled "The I-1000 Internet Tuner", 2 pages, date unknown.
iReady article entitled "About Us Introduction", Internet pages fromhttp://www.iReadyco.com/about.html, 3 pages, printed Nov. 25, 1998.
iReady News Archive article entitled "Revolutionary Approach to Consumer Electronics Internet Connectivity Funded", San Jose, CA, Nov. 20,1997. 2 pages, printed Nov. 2, 1998.
iReady News Archive article entitled "Seiko Instruments Inc. (SII) Introduces World'S First Internet-Ready Intelligent LCD Modules Based on Iready Technology," Santa Clara, CA and Chiba, Japan, Oct. 26, 1998. 2 pages, printed Nov. 2, 1998.
NEWSwatch article entitled "iReady internet Tuner to Web Enable Devices", Tuesday, Nov. 5, 1996, printed Nov. 2, 1998, 2 pages.
EETimes article entitled "Tuner for Toshiba, Toshiba Taps iReady for Internet Tuner", by David Lammers, 2 pages, printed Nov. 2, 1998.
"Comparison of Novell Netware and TCP/IP Protocol Architectures", by J.S. Carbone, 19 pages, printed Apr. 10, 1998.
Adaptec article entitled "AEA-7110C-a DuraSAN product", 11 pages, printed Oct. 1, 2001.
iSCSI HBA article entitled "iSCSI and 2Gigabit fibre Channel Host Bus Adapters from Emulex, QLogic, Adaptec, JNI", 8 pages, printed Oct. 1, 2001.
iSCSI HBA article entitled "FCE-3210/6410 32 and 64-bit PCI-to-Fibre Channel HBA", 6 pages, printed Oct. 1, 2001.
ISCSI.com article entitled "iSCSI Storage", 2 pages, printed Oct. 1, 2001.
"Two-Way TCP Traffic Over Rate Controlled Channels: Effects and Analysis", by Kalampoukas et al., IEEE Transactions on Networking, vol. 6, No. 6, Dec. 1998, 17 pages.
IReady News article entitled "Toshiba Delivers First Chips to Make Consumer Devices Internet-Ready Based on iReady Design", Santa Clara, CA, and Tokyo, Japan, Oct. 14, 1998, printed Nov. 2, 1998, 3 pages.
Internet pages of InterProphet entitled "Frequently Asked Questions", by Lynne Jolitz, printed Jun. 14, 1999, 4 pages.
"File System Design for an NFS File Server Appliance", Article by D. Hitz, et al., 13 pages.
Adaptec Press Release article entitled "Adaptec Announces EtherStorage Technology", 2 pages, May 4, 2000, printed Jun. 14, 2000.
Adaptec article entitled "EtherStorage Frequently Asked Questions", 5 pages, printed Jul. 19, 2000.

(56) References Cited

OTHER PUBLICATIONS

Adaptec article entitled "EtherStorage White Paper", 7 pages, printed Jul. 19, 2000.
CIBC World Markets article entitled "Computers; Storage", by J. Berlino et al., 9 pages, dated Aug. 7, 2000.
Merrill Lynch article entitled "Storage Futures", by S. Milunovich, 22 pages, dated May 10, 2000.
CBS Market Watch article entitled "Montreal Start-Up Battles Data Storage Botttleneck", by S. Taylor, dated Mar. 5, 2000, 2 pages, printed Mar. 7, 2000.
Internet-draft article entitled "SCSI/TCP (SCSI over TCP)", by J. Satran et al., 38 pages, dated Feb. 2000, printed May 19, 2000.
Internet pages entitled Technical White Paper-Xpoint's Disk to LAN Acceleration Solution for Windows NT Server, printed Jun. 5, 1997, 15 pages.
Jato Technologies article entitled Network Accelerator Chip Architecture, twelve-slide presentation, printed Aug. 19, 1998, 13 pages.
EETimes article entitled Enterprise System Uses Flexible Spec, dated Aug. 10, 1998, printed Nov. 25, 1998, 3 pages.
Internet pages entitled "Smart Ethernet Network Interface Cards", which Berend Ozceri is developing, printed Nov. 25, 1998, 2 pages.
Internet pages of Xaqti corporation entitled "GigaPower Protocol Processor Product Review," printed Nov. 25, 1999, 4 pages.
U.S. Appl. No. 60/283,896, Titled: CRC Calculations for Out of Order PUDs, filed Apr. 12, 2003, Inventor: Amit Oren, Assignee: Siliquent Technologies Ltd.
Internet pages entitled "DART: Fast Application Level Networking via Data-Copy Avoidance," by Robert J. Walsh, printed Jun. 3, 1999, 25 pages.
Andrew S. Tanenbaum, Computer Networks, Third Edition, 1996, ISBN 0-13-349945-6.
Article from Rice University entitled "LRP: A New Network Subsystem Architecture for Server Systems", by Peter Druschel and Gaurav Banga, 14 pages.
Internet RFC/STD/FYI/BCP Archives article with heading "RFC2140" entitled "TCP Control Block Interdependence", web address http://www.faqs.org/rfcs/rfc2140.html, 9 pages, printed Sep. 20, 2002.
WindRiver article entitled "Tornado: For Intelligent Network Acceleration", copyright Wind River Systems, 2001, 2 pages.
WindRiver White Paper entitled "Complete TCP/IP Offload for High-Speed Ethernet Networks", Copyright Wind River Systems, 2002, 7 pages.
Intel article entitled "Solving Server Bottlenecks with Intel Server Adapters", Copyright Intel Corporation, 1999, 8 pages.
Schwaderer et al., IEEE Computer Society Press publication entitled, "XTP in VLSI Protocol Decomposition for ASIC Implementation", from 15th Conference on Local Computer Networks, 5 pages, Sep. 30-Oct. 3, 1990.
Beach, Bob, IEEE Computer Society Press publication entitled, "UltraNet: An Architecture for Gigabit Networking", from 15th Conference on Local Computer Networks, 18 pages, Sep. 30-Oct. 3, 1990.
Chesson et al., IEEE Syposium Record entitled, "The Protocol Engine Chipset", from Hot Chips III, 16 pages, Aug. 26-27, 1991.
Maclean et al., IEEE Global Telecommunications Conference, Globecom '91, presentation entitled, "An Outboard Processor for High Performance Implementation of Transport Layer Protocols", 7 pages, Dec. 2-5, 1991.
Ross et al., IEEE article entitled "FX1000: A high performance single chip Gigabit Ethernet NIC", from Compcon '97 Proceedings, 7 pages, Feb. 23-26, 1997.
Strayer et al., "Ch. 9: The Protocol Engine" from XTP: The Transfer Protocol, 12 pages, Jul. 1992.
Publication entitled "Protocol Engine Handbook", 44 pages, Oct. 1990.
Koufopavlou et al., IEEE Global Telecommunications Conference, Globecom '92, presentation entitled, "Parallel TCP for High Performance Communication Subsystems", 7 pages, Dec. 6-9, 1992.
Lilienkamp et al., Publication entitled "Proposed Host-Front End Protocol", 56 pages, Dec. 1984.
Thia et al. Publication entitled "High-Speed OSI Protocol Bypass Algorithm with Window Flow Control," Protocols for High Speed Networks, pp. 53-68, 1993.
U.S. Appl. No. 60/053,240, Titled: TCP/IP Network Accelerator and Method of Use, filed Jul. 17, 1997, Inventor: William Jolizt et al.
Thia et al. Publication entitled "A Reduced Operational Protocol Engine (ROPE) for a multiple-layer bypass architecture," Protocols for High Speed Networks, pp. 224-239, 1995.
Form 10-K for Exelan, Inc., for the fiscal year ending Dec. 31, 1987 (10 pages).
Form 10-K for Exelan, Inc., for the fiscal year ending Dec. 31, 1988 (10 pages).

\* cited by examiner

TCP OFFLOAD DEVICE THAT BATCHES SESSION LAYER HEADERS TO REDUCE INTERRUPTS AS WELL AS CPU COPIES

CROSS REFERENCE TO RELATED APPLICATIONS

This application claims the benefit under 35 U.S.C. §119 of provisional application No. 61/107,439, filed by the same inventors on Oct. 22, 2008, which is incorporated by reference herein.

BACKGROUND AND DISCLOSURE OF THE INVENTION

This invention relates to network communication, for example serial communication between devices using a protocol such as Transmission Control Protocol (TCP).

TCP has been employed for decades and has increased in popularity, or at least in usage, over the years. An advantage of TCP is its guaranteed delivery of error free data. Unfortunately, this guarantee comes with a price of greater complexity relative to some other network protocols. Such complexity can slow TCP communication, or at least make it difficult for TCP to be used as network data rates increase, for example from 100 MB/s ten years ago to 10 GB/s currently. Moreover, even for a 100 MB/s transmission line rate that was conventional ten years ago, TCP processing at the endpoints of the network proved a bottleneck that slowed network communication, as well as consumed inordinate CPU cycles.

A solution to the TCP bottleneck was provided by Alacritech, Inc., which offloaded established TCP connections from the host CPU to hardware that could process data transfer much more rapidly, significantly increasing TCP data transfer rates while reducing CPU utilization. Descriptions and claims to such a solution can be found in multiple patents, including U.S. Pat. Nos. 7,337,241; 7,284,070; 7,254,696; 7,237,036; 7,191,318; 7,191,241; 7,185,266; 7,174,393; 7,167,927; 7,167,926; 7,133,940; 7,124,205; 7,093,099; 7,089,326; 7,076,568; 7,042,898; 6,996,070; 6,965,941; 6,941,386; 6,938,092; 6,807,581; 6,757,746; 6,751,665; 6,697,868; 6,687,758; 6,658,480; 6,591,302; 6,470,415; 6,434,620; 6,427,173; 6,427,171; 6,393,487; 6,389,479; 6,334,153; 6,247,060; and 6,226,680, which are incorporated by reference herein.

For a situation in which an application is running on a host CPU while a TCP connection for that application is handled by a network interface card (NIC), however, communications between the host and the device could sometimes hamper performance. For example, to receive data for an offloaded connection, the network interface card would "indicate" a small amount of data that included a session layer header to the host. The host would move that small amount of data, via the device driver and the host's TCP/IP stack, to the application, which would then process the session layer header to allocate buffers for the data corresponding to the session layer header. The card could then place the data, by direct memory access (DMA), into the buffers allocated by the application, so that the host CPU could completely avoid copying the application data. This was sometimes termed a "zero-copy receive."

Zero-copy receive works particularly well for receiving relatively large blocks of data transported in multiple packets, in which case the data can be placed in a destination with relatively few interrupts. But for relatively small blocks of data transported in one or two packets, the interrupts generated when the session layer headers and data cross an input/output (I/O) bus can impair performance. The present inventors have discovered that one reason for this is that interrupt aggregation, which may otherwise allow several received packets to be passed from a NIC to a host CPU with a single interrupt, can be rendered ineffective by the sequential transport of session layer headers across the I/O bus, each of which needs to be processed by an application before the next session layer header is transported over the I/O bus.

In the case of a solicited receive, in which the data being received is in response to a read request, there is an opportunity to pre-post a receive buffer along with the request. That is, because the application will be receiving data that it has requested, a buffer for that data can be allocated at the time the request is made. This allows the response to be placed in the appropriate memory location when the response arrives, without processing the session layer header by the application. For an unsolicited receive, however, a mechanism does not exist to pre-allocate a buffer or buffers for incoming data, because the amount of data and the aspect of the application that is involved are not known before the data is received. Moreover, as a practical matter, pre-posting buffers for solicited receives is not widely employed by current commercial applications, so that the performance issues described above affect more than merely unsolicited receives.

The most common applications that use TCP, such as Server Message Block (SMB) and Common Internet File System (CIFS), Network File System (NFS), and Internet Small Computer System Interface (iSCSI), all have certain aspects in common. Data sent by a client (or initiator) to a server (or target), is comprised of a session layer header (sometimes called an application header), possibly followed by session layer data (sometimes called application data). When session-layer data exists, the session layer header describes the nature and length of the data. Since these session layer headers and data exist within the TCP data stream, they can be located anywhere in received TCP packet.

Because TCP is a byte-stream protocol that is designed to deliver data in the correct order to the applications above it, which are designed to process that data in order, having session layer headers located anywhere in received TCP packet is usually immaterial, because the application simply processes the data in order as it works its way through packets. But an issue exists for offloaded TCP, as mentioned above, because the sequential processing of session layer headers and data can result in extra interrupts for relatively small data blocks.

DETAILED DESCRIPTION

An example of the issue and some solutions that have been developed may be instructive at this point. Note that while this example centers around data sent from an iSCSI initiator to an iSCSI target, the same logic applies in the other direction (iSCSI target to iSCSI initiator). Furthermore the same reasoning also applies to other applications that share a similar format (session-layer header followed by session layer payload), including both SMB/CIFS and NFS. Moreover, while TCP is discussed as the transport layer protocol, other similar connection-based, byte-stream protocols could instead be employed.

Figure 1:
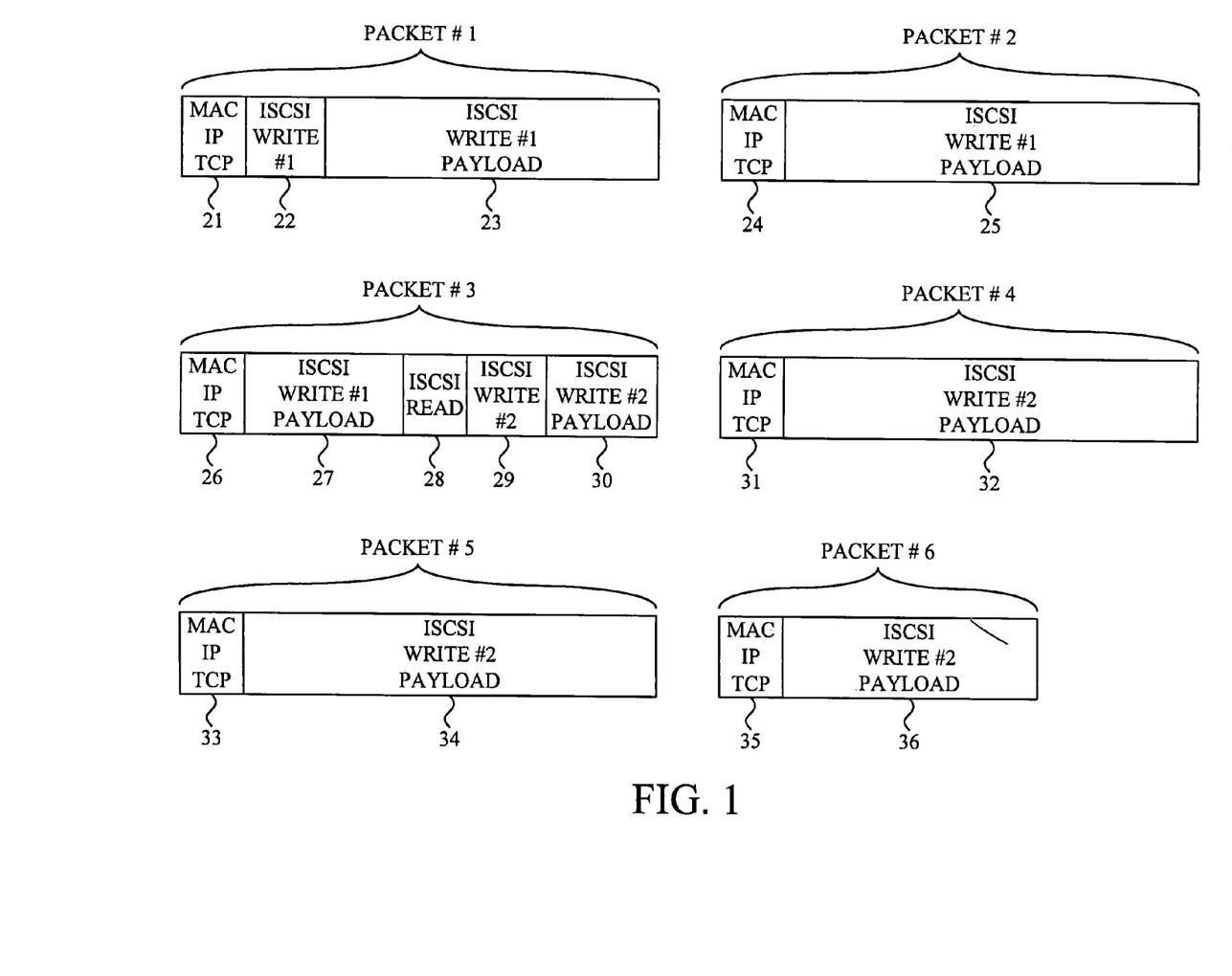
FIG. 1 shows a schematic diagram of a prior art series of packets received for a TCP connection, including headers and data.

In the example shown in FIG. 1, three iSCSI Protocol Data Units (PDUs) for a particular TCP connection have been received by an iSCSI target. These PDUs include an iSCSI write request with 4 KB of application data, an iSCSI read request, and a subsequent 4 KB iSCSI write request. Assuming a standard Ethernet maximum transmission unit (MTU) size of approximately 1.5 KB and no IP or TCP options, the corresponding packets on the wire would appear as shown in FIG. 1.

Packet #1 includes MAC, IP and TCP headers 21 totaling 54 B, the iSCSI write request #1 session layer header 22 of 48 B, and the first 1412 B of the iSCSI write request #1 payload 23. Packet #2 includes MAC, IP and TCP headers 24 totaling 54 B, and the next 1460 B of the iSCSI write request #1 payload 25. Packet #3 includes MAC, IP and TCP headers 26 totaling 54 B, the last 1224 B of the iSCSI write request #1 payload 27, the iSCSI read request session layer header 28 of 48 B, the iSCSI write request #2 session layer header 29 of 48 B, and the first 140 B of the iSCSI write request #2 payload 30. Packet #4 includes MAC, IP and TCP headers 31 totaling 54 B, and the next 1460 B of the iSCSI write request #2 payload 32. Packet #5 includes MAC, IP and TCP headers 33 totaling 54 B, and the next 1460 B of the iSCSI write request #2 payload 34. Finally, packet #6 includes MAC, IP and TCP headers 35 totaling 54 B, and the remaining 1036 B of the iSCSI write request #2 payload 36.

Thus, one can see that the first 4 KB write spans the first three packets (1412 bytes of the first, 1460 of the second, and 1224 of the third, totaling 4096 bytes). This places the subsequent iSCSI headers at offsets 1278 and 1326 into the third packet respectively. Then, the second iSCSI request spans packets 3, 4, 5, and 6, again totaling 4096 bytes.

Conventionally, the above packets would typically have been processed as follows:

1) One or more packets will be received by the NIC and DMAd into packet buffers allocated by the NIC device driver. Assuming a fast network, and some amount of interrupt latency (interrupt aggregation enabled), this could include all six of the above packets. The remainder of this example assumes this to be the case.

2) Interrupt occurs.

3) The NIC device driver delivers all six packets to the protocol stack (Microsoft's TCPIP.SYS for example).

4) The protocol stack processes the MAC, IP, and TCP protocol headers (21, 24, 26, 31, 33 and 35), and "indicates" the TCP payload, starting with the first iSCSI write request, up to the iSCSI target software.

5) iSCSI target software processes the iSCSI Write Request #1 header 22, locates the memory location for iSCSI payload (23, 25 and 27), and passes this memory location down to the protocol stack.

6) The protocol stack copies, using the host processor, the payload (23, 25 and 27) for iSCSI write request #1 from packets 1, 2 and 3, into the memory location specified by the iSCSI target software.

7) The protocol stack completes this posted buffer and indicates the remainder of packet #3 to the iSCSI target software.

8) The iSCSI target software processes the iSCSI read request 28 and the second iSCSI write request 29, locates the memory location for the iSCSI write #2 payload (30, 32, 34 and 36) and passes this memory location down to the stack.

9) The protocol stack copies the application data (30, 32, 34 and 36) from packets 3, 4, 5 and 6 into this memory location and completes the posted buffer.

With the use of TCP offload, for example a TCP offload engine (TOE) device such as that invented by Alacritech in conjunction with a Microsoft® TCP Chimney protocol stack, there is an opportunity to eliminate the data copies in steps 6 and 9 in the above sequence of operations. As one example, the following may occur:

1) TOE device processes the MAC, IP and TCP headers (21, 24, 26, 31, 33 and 35) of each packet.

2) TOE device interrupts the host and delivers the TCP payload of Packet #1, including iSCSI Write Request #1 and iSCSI Write #1 payload of Packet #1 (22 and 23), to the device driver.

3) Device driver and protocol stack deliver TCP payload of Packet #1 (22 and 23) to iSCSI target software.

4) iSCSI target software processes Write Request 22, locates the memory location for iSCSI payload 23, and passes this memory location down to the protocol stack and TOE device driver.

5) TOE device driver passes this memory location to the TOE device.

6) TOE device DMAs the payload (23, 25 and 27) for iSCSI write #1 directly into the memory location specified by the iSCSI target software.

7) TOE device interrupts the host, completes the posted buffer for iSCSI write #1 and delivers the remainder of packet #3 which contains the iSCSI headers for the iSCSI read 28 and the second iSCSI write 29.

8) The TCP data from packet #3 (28, 29 and 30) is delivered to the iSCSI target software.

9) iSCSI target software processes iSCSI headers (28 and 29), locates memory location for iSCSI payload and passes this memory location down to the stack and TOE device driver.

10) TOE device driver passes this memory location to the TOE device.

11) TOE device DMAs the payload (30, 32, 34 and 36) for iSCSI write #2 directly into the memory location specified by the iSCSI target software.

12) TOE device interrupts the host, and completes the posted buffer for iSCSI write #2.

An issue with this approach is that eliminating these data copies comes at the expense of extra interrupts, as well as associated trips through the stack and device driver. In the prior conventional sequence of events there is a single interrupt and a single indication from the network device driver up to the TCPIP stack. In the sequence of events described immediately above, there are three interrupts—the original indication, the first buffer completion and second data indication, and lastly the second buffer completion. Furthermore, while the posted buffer in the first sequence of operations is only handed down as far as the stack, in the second sequence of operations it gets passed down to the device driver and out to the card as well, each portion of which requires some amount of overhead.

These two scenarios illustrate a trade-off between "batching"—processing several things at once as illustrated in the first case—and "zero copy". When payload sizes are relatively small, as is the case in this example, the overhead of extra interrupts and trips through the protocol stack outweigh the zero-copy benefits. As payload sizes get larger (64 KB for example) the zero-copy benefits outweigh the batching benefits.

What would be desirable is a means to process a batch of session layer headers while holding the session layer payload out on the TOE device until corresponding buffers can be posted. Note that one difficulty with this objective is that session layer headers need not be located near the front of received packets, contiguous with TCP headers, but may instead be buried within the session layer payload data like in packet #3, with the session layer data and headers all being simply data to the TCP layer.

Figure 2:
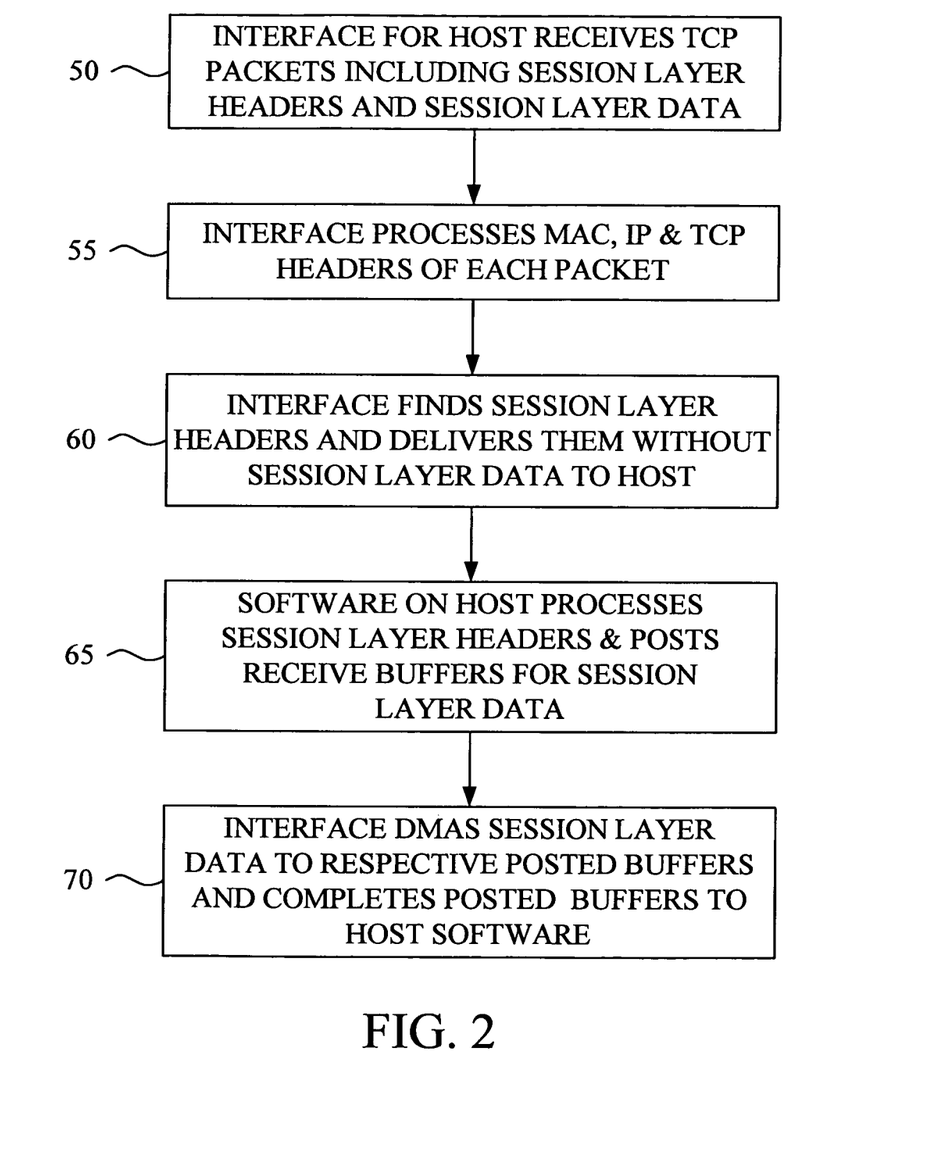
FIG. 2 shows a schematic diagram of a method for processing a series of packets such as those shown in FIG. 1.

In one embodiment in accordance with this objective, assuming the same packets were received as in the above examples, the following sequence of events occurs as shown in FIG. 2:

Step 1 (50): A network interface including a TOE device receives a plurality of TCP packets that include session layer headers and session layer data.

Step 2 (55): As the packets arrive, the interface processes MAC, IP and TCP headers (21, 24, 26, 31, 33 and 35).

Step 3 (60): The interface locates the iSCSI headers (22, 28 and 29) within TCP data stream and delivers them, independently of the data, to the host. Note that this step can occur along with Step 2, so that for example the interface can locate iSCSI header 22 prior to or at the same time as processing MAC, IP and TCP headers 24.

Step 4 (65): iSCSI target software on the host processes the three iSCSI headers (22, 28 and 29) and posts receive buffers for the application data from iSCSI write #1 and iSCSI write #2.

Step 5 (70): The interface DMAs the iSCSI payload (23, 25 and 27) into the posted buffer for write #1 and DMAs the iSCSI payload (30, 32, 34 and 36) into the posted buffer for write #2, and completes the posted buffers back to the iSCSI target.

Note that this is substantially different than conventional receive processing in several ways.

First, a unique aspect of the above sequence of operations is that data is delivered to the session layer (iSCSI target software in this example) is discontiguous—48 bytes from the first packet, and 96 from the third packet, with a gap in between. As such, this may involve significantly modifying the session-layer software to make it aware that it will be handed discontiguous blocks of data and that corresponding data buffers will be expected for the missing pieces.

Furthermore, since this solution may involve modifications to the session-layer software, we may as well go one step further and have the session-layer software (iSCSI target software in this example but also applicable to SMB/CIFS and NFS) communicate directly with the TOE device, rather than have data indications travel up through the NIC device driver and TCP/IP stack, or have posted receive buffers travel down the other direction.

Lastly, for the above sequence of operations the network interface has been enhanced to do a certain amount of session-layer header processing in order to locate the position of each session-layer header within the TCP data stream. Note that this would be virtually impossible to accomplish without TCP offload since there would be no way to verify the continuity of integrity of the data stream without first processing the corresponding TCP headers. TCP retransmissions or dropped packets would wreak havoc on any attempts to do this without TOE. In one embodiment, the network interface may analyze each received session layer header to determine the length of any corresponding application data that follows the header, in order to calculate the offset of the next session layer header.

In one exemplary embodiment, a session layer descriptor ring can be used to implement the transfer of a plurality of session layer headers from the network interface to the host for processing by the application. Note that a descriptor ring is merely used as an example, and that any host memory structure that is accessible by the NIC and maintains the session layer headers in order, such as a first-in first-out (FIFO) memory or a queue could instead be used. In one implementation, a first descriptor ring may be used for the session layer headers, and a second descriptor ring or other ordered memory structure may be used for the locations for storing session layer data, or for pointers to those locations. In one implementation, pointers to session layer headers can be used, wherein the pointers are stored in a memory structure that maintains the pointers in order. Note that session layer headers are sometimes called application layer headers.

In our iSCSI target example, the "session layer header" ring may consist of a collection of "descriptors" where each descriptor includes 48-bytes for an iSCSI header, and possibly additional status information to be shared between the iSCSI target software and the network interface. Entries on this ring can be filled in by the network interface as it encounters session layer headers. As it fills in entries on this ring, it would advance its location in the ring and notify the host (iSCSI target software) that its ring location has changed. The iSCSI target software would then walk down the ring, processing these descriptors and the iSCSI session-layer headers contained within them.

Figure 3:
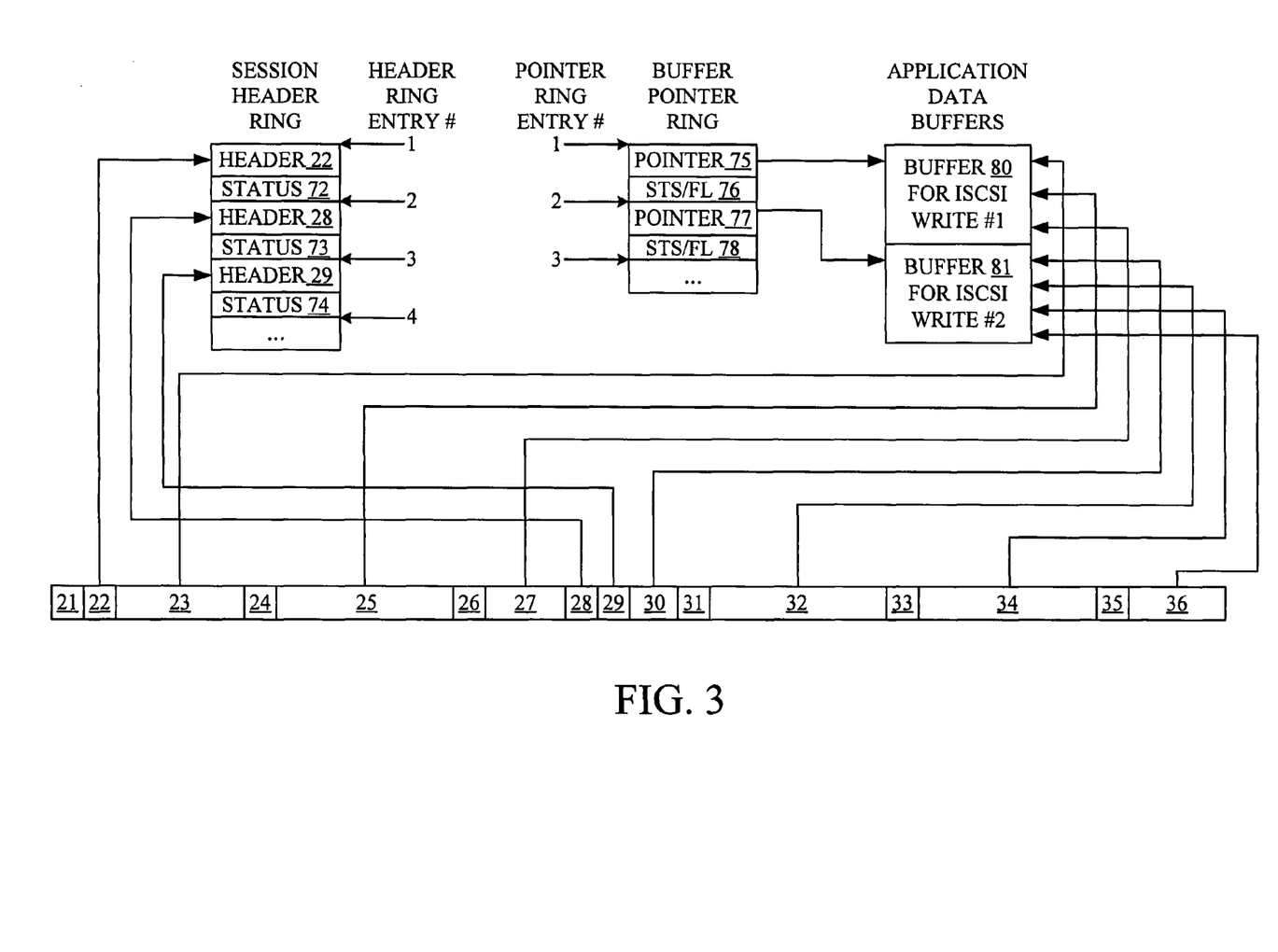
FIG. 3 shows a schematic diagram of a system for processing a series of packets such as those shown in FIG. 1.

The second ring may serve as a "buffer pointer" ring. Each entry within this ring would contain a pointer to a block of memory (or a scatter gather list representing such memory), and possibly associated status and/or flags. These entries would be filled in by the iSCSI target software as it processes iSCSI headers which describe subsequent iSCSI payload. Referring now to FIG. 3, which shows at the bottom the stream of received packet data corresponding to a particular TCP connection from FIG. 1, the following could take place:

1) TOE device processes MAC, IP and TCP headers 21 of packet #1.

2) Network interface processes TCP data of packet #1, including filling in the first entry in the session layer header ring by DMAing the session layer header 22 for iSCSI write #1 into it and filling in associated status 72, while holding on to the payload 23.

3) Network interface advances its current session header ring location to entry #2.

4) TOE device processes MAC, IP and TCP headers 24 of packet #2 and network interface holds on to the payload 25.

5) TOE device processes MAC, IP and TCP headers 26 of packet #2 and network interface fills in entries two and three of the session header ring with iSCSI headers 28 & 29, optionally including status 73 & 74, while hanging on to the end of the iSCSI write #1 payload 27 and the start of iSCSI write #2 payload 30.

6) Network interface advances its current session header ring location to entry #4.

7) Interrupt occurs—This could have occurred after step 4, but in this example is delayed due to interrupt aggregation.

8) The iSCSI target software compares its current session header ring location (1) to the network interface's current session header ring location (4) and determines that there are 3 headers to be processed.

9) The iSCSI target software processes entry #1 in the session header ring, and locates the memory location associated with iSCSI write #1.

10) The iSCSI target software fills in the first entry in the buffer pointer ring with a pointer 75 to this memory location (or a scatter gather list associated with it) as well as corresponding status and/or flags 76. In an alternative embodiment, instead of using a pointer ring the iSCSI target software may at this time simply provide a buffer for iSCSI write #1.

11) The iSCSI target software advances its buffer pointer ring location to entry 2.

12) The iSCSI target software processes entry #2 in the session header ring and arranges for a read response to be sent.

13) The iSCSI target software processes entry #3 in the session header ring and locates the memory locations associated with iSCSI write #2.

14) The iSCSI target software fills in the second entry in the buffer pointer ring with a pointer 77 to this memory location (or a scatter gather list associated with it) as well as corresponding status and/or flags 78.

15) The iSCSI target software advances its buffer pointer ring location to entry 3.

16) The iSCSI target software notifies the network interface (via a register write for example) of its new location in the buffer pointer ring.

17) The network interface compares its buffer pointer ring location against the host's newly written ring location and determines that there are two new entries to be processed.

18) The network interface processes the first entry in the buffer pointer ring to obtain the memory location for iSCSI write #1.

19) The network interface DMAs payload data (23, 25 and 27) from packets 1, 2 and 3 into the memory location specified by the buffer pointer ring entry #1, buffer 80.

20) The network interface processes the second entry in the buffer pointer ring to obtain the memory location for iSCSI write #2.

21) The network interface DMAs payload data (30, 32, 34 and 36) from packets 3, 4, 5 and 6 into the memory location specified by the buffer pointer ring entry #2, buffer 81.

22) The network interface advances its buffer pointer ring location to entry 3 and notifies the host (iSCSI target software).

23) The iSCSI target software compares the network interface's previous location (1) to the network interface's new location (3) and determines that entries 1 and 2 of the buffer pointer ring are now completed.

Thus, multiple session layer PDUs have been processed in a batch while the host CPU has been freed of copying data or even headers.

Figure 4:
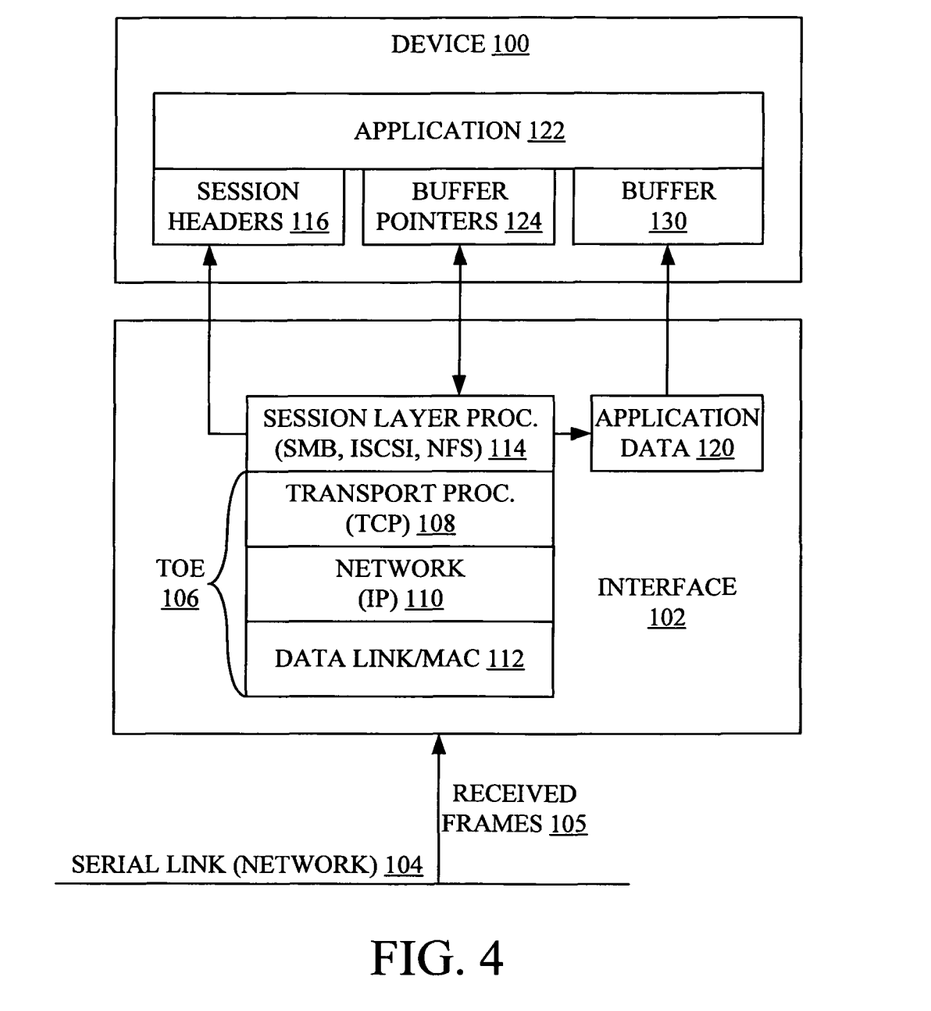
FIG. 4 shows a block diagram of a system for processing a series of packets such as those shown in FIG. 1.

A schematic block diagram of a system that performs the above methods is shown in FIG. 4. A device 100 such as a computer has an interface such as network interface 102 that is connected to a serial link 104 such as a network, for example to receive Ethernet frames 105. The interface 102 has a TOE 106 including transport mechanism or processor 108 that processes at least data transfers for established TCP connections. Optionally, the TOE 106 may fully offload TCP, including establishing and terminating TCP connections as well as performing data transfer and all other details of the TCP protocol. The TOE 106 may also include mechanisms 110 and 112 to process network layer protocols (e.g., IP) and data link or media access control (MAC) protocols, respectively.

The interface 102 also includes a mechanism 114, such as instructions running on a processor, to analyze received session layer headers (e.g., SMB, iSCSI and NFS) to be able to locate such session layer headers even when they are surrounded by application data, so that the session layer headers can be removed from the application data and provided by the interface to a memory structure 116 such as a descriptor ring. The application data is split from the session layer headers and held on the interface in a memory 120 that preserves its order. An application 122 that corresponds to the TCP connection running on the interface can access the memory structure 116 holding the session layer headers, and in processing the headers determines a location such as buffer 130 for the corresponding application data. The address of that location may be held in memory structure 124 as a pointer to the buffer 130 for the data. The session layer mechanism 114 accesses the pointers in memory structure 124 to direct a DMA unit of interface 102 to move the application data to buffer 130. In an alternative embodiment the application data that has been received can be held on a buffer of the device 100, and moved to a buffer such as buffer 130 denoted by the application by a DMA unit of the device, rather than by a DMA unit of the interface 102.

As will be recognized by those skilled in the art, the innovative concepts described in the present application can be modified and varied over a tremendous range of applications, and accordingly the scope of patented subject matter is not limited by any of the specific exemplary teachings given. While the invention has been particularly shown and described with reference to a preferred embodiment, it will be understood by those skilled in the art that various changes in form and detail may be made therein without departing from the spirit and scope of the invention. None of the description in the present application should be read as implying that any particular element, step, or function is an essential element which must be included in the claim scope. THE SCOPE OF PATENTED SUBJECT MATTER IS DEFINED ONLY BY THE ALLOWED CLAIMS. Moreover, none of these claims are intended to invoke paragraph six of 35 USC Section 112 unless the exact words "means for" are followed by a participle.

The invention claimed is:

1. A method comprising:

running an application on a device having an interface;

running, on the interface, a transmission control protocol (TCP) connection for the application, including maintaining a TCP control block (TCB) by the interface;

receiving, by the interface, a packet including a TCP header, an upper layer header corresponding to a protocol higher than TCP, and application data, wherein the upper layer header is separated from the TCP header by the application data;

associating, by the interface, the packet with the TCP connection, including processing the packet against the TCB;

providing the upper layer header to the device;

processing the upper layer header by the application; and providing, by the interface to the device, the application data, after the processing of the upper layer header.

2. The method of claim 1, wherein receiving the packet is not in response to a request by the application for the application data.

3. The method of claim 1, further comprising:

analyzing the upper layer header, prior to providing the upper layer header to the device.

4. The method of claim 1, further comprising:

receiving a second packet corresponding to the TCP connection and containing a second upper layer header; and processing the second upper layer header by the application prior to providing, by the network interface to the device, the application data.

5. The method of claim 1, further comprising:

splitting, by the interface, the upper layer header from the data; and providing the upper layer header and the data to the device separately.

6. The method of claim 1, wherein providing, by the interface to the device, the application data includes providing the application data to a descriptor ring.

7. The method of claim 1, wherein processing the upper layer header by the application includes determining a location for the application data, and further comprising placing a description of that location in a descriptor ring.

8. The method of claim 1, wherein processing the upper layer header by the application includes determining a location for the application data, and wherein providing, by the interface to the device, the application data includes placing the application data in the location.

9. The method of claim 1, wherein the upper layer header is a session layer header.

10. The method of claim 1, wherein the upper layer header is an Internet Small Computer System Interface (iSCSI) header.

11. The method of claim 1, wherein the upper layer header is a Server Message Block (SMB) header.

12. The method of claim 1, wherein the upper layer header is a Network File System (NFS) header.

13. The method of claim 1, wherein the interface includes a TCP Offload Engine (TOE).

14. The method of claim 1, further comprising:
establishing the TCP connection by the device, prior to running the TCP connection by the interface.

15. A method comprising:
running an application on a device having an interface;
running, on the interface, a transmission control protocol (TCP) connection for the application, including maintaining a TCP control block (TCB) by the interface;
receiving, by the interface, a plurality of packets each including a TCP header, wherein a first of the packets contains a first upper layer header and corresponding first data, a second of the packets contains a second upper layer header and corresponding second data, and the upper layer headers correspond to a protocol higher than TCP;
associating, by the interface, the packets with the TCP connection, including processing the packets against the TCB;
providing, by the interface to the device, the first and second upper layer headers;
processing the first upper layer header by the application, including allocating a first destination for the first data;
then processing the second upper layer header by the application, including allocating a second destination for the second data; and
providing, by the interface to the first destination, the first data, after the processing of the second upper layer header.

16. The method of claim 15, wherein providing, by the interface to the device, the first and second upper layer headers includes storing the headers in a memory structure holding a plurality of upper layer headers in an order in which they were transmitted.

17. The method of claim 15, wherein providing, by the interface to the device, the first and second upper layer headers includes storing the headers in a descriptor ring.

18. The method of claim 15, further comprising:
storing a pointer to the first destination and a pointer to the second destination in a memory of the device that is accessible by the interface.

19. An apparatus comprising:
a device including a processor running an application;
an interface for the device, the interface running a Transmission Control Protocol (TCP) connection for the application; and
a memory structure that is accessible by the device and the interface, the memory structure storing a plurality of upper layer headers in an order in which they were received by the interface, such that the plurality of upper layer headers are present simultaneously in the memory structure, wherein the upper layer headers are separated from received data that they refer to and the upper layer headers correspond to a protocol higher than TCP.

20. The apparatus of claim 19, further comprising:
a second memory structure that is accessible by the device and the interface, the second memory structure adapted to store a plurality of pointers to locations for storing the data, the second memory structure adapted to store the pointers in an order in which the upper layer headers were processed by the application.

21. The apparatus of claim 19, wherein the interface is adapted to analyze the session layer headers.

22. The apparatus of claim 19, wherein the interface is adapted to separate the upper layer headers from the data and to provide the upper layer headers and the data separately to the device.

* * * * *